United States Patent
Xue et al.

(10) Patent No.: US 9,744,529 B2
(45) Date of Patent: Aug. 29, 2017

(54) INTEGRATED LNT-TWC CATALYST

(71) Applicant: BASF Corporation, Florham Park, NJ (US)

(72) Inventors: Wen-Mei Xue, Dayton, NJ (US); Attilio Siani, Hannover (DE); John K. Hochmuth, Raritan, NJ (US); Markus Kinne, Hannover (DE); Stefan Kielbassa, Hannover (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/658,486

(22) Filed: Mar. 16, 2015

(65) Prior Publication Data

US 2015/0266014 A1   Sep. 24, 2015

Related U.S. Application Data

(60) Provisional application No. 61/968,669, filed on Mar. 21, 2014.

(51) Int. Cl.
*B01D 53/94* (2006.01)
*F01N 3/08* (2006.01)
(Continued)

(52) U.S. Cl.
CPC ........ *B01J 35/0006* (2013.01); *B01D 53/945* (2013.01); *B01D 53/9422* (2013.01);
(Continued)

(58) Field of Classification Search
CPC . B01J 21/04; B01J 21/066; B01J 23/02; B01J 23/10; B01J 23/40; B01J 23/42;
(Continued)

(56) References Cited

U.S. PATENT DOCUMENTS

| | | | |
|---|---|---|---|
| 5,254,519 A | * | 10/1993 | Wan ............... B01D 53/945 423/213.5 |
| 5,448,887 A | | 9/1995 | Takeshima |

(Continued)

FOREIGN PATENT DOCUMENTS

| | | |
|---|---|---|
| EP | 1419810 | 5/2004 |
| GB | 2414690 | 12/2005 |

(Continued)

OTHER PUBLICATIONS

Int. Search Report/Written Opinion dated May 29, 2015.
(Continued)

*Primary Examiner* — Cam N. Nguyen
(74) *Attorney, Agent, or Firm* — Womble Carlyle Sandridge & Rice LLP

(57) ABSTRACT

A layered catalyst composite for the treatment of exhaust gas emissions, effective to provide lean $NO_x$ trap functionality and three-way conversion functionality is described. Layered catalyst composites can comprise catalytic material on a substrate, the catalytic material comprising at least two layers. The first layer comprising rare earth oxide-high surface area refractory metal oxide particles, an alkaline earth metal supported on the rare earth oxide-high surface area refractory metal oxide particles, and at least one first platinum group metal component supported on the rare earth oxide-high surface area refractory metal oxide particles. The second layer comprising a second platinum group metal component supported on a first oxygen storage component (OSC) and/or a first refractory metal oxide support and, optionally, a third platinum group metal supported on a second refractory metal oxide support or a second oxygen storage component.

28 Claims, 6 Drawing Sheets

(51) Int. Cl.
*F01N 3/28* (2006.01)
*B01J 21/04* (2006.01)
*B01J 21/06* (2006.01)
*B01J 23/02* (2006.01)
*B01J 23/10* (2006.01)
*B01J 23/40* (2006.01)
*B01J 23/42* (2006.01)
*B01J 23/46* (2006.01)
*B01J 23/54* (2006.01)
*B01J 23/56* (2006.01)
*B01J 23/58* (2006.01)
*B01J 23/63* (2006.01)
*B01J 35/00* (2006.01)
*B01J 35/04* (2006.01)
*B01J 37/02* (2006.01)

(52) U.S. Cl.
CPC ............. *B01J 21/04* (2013.01); *B01J 21/066* (2013.01); *B01J 23/63* (2013.01); *B01J 35/002* (2013.01); *B01J 35/04* (2013.01); *B01J 37/0244* (2013.01); *B01J 37/0248* (2013.01); *F01N 3/0842* (2013.01); *F01N 3/2828* (2013.01); *B01D 2255/1021* (2013.01); *B01D 2255/1023* (2013.01); *B01D 2255/1025* (2013.01); *B01D 2255/2042* (2013.01); *B01D 2255/2047* (2013.01); *B01D 2255/2065* (2013.01); *B01D 2255/2092* (2013.01); *B01D 2255/20715* (2013.01); *B01D 2255/407* (2013.01); *B01D 2255/908* (2013.01); *B01D 2255/9022* (2013.01); *B01D 2255/91* (2013.01); *B01D 2258/012* (2013.01); *F01N 2510/0684* (2013.01); *Y02T 10/22* (2013.01); *Y02T 10/24* (2013.01)

(58) Field of Classification Search
CPC ... B01J 23/46; B01J 23/54; B01J 23/56; B01J 23/58; B01J 23/63; B01J 35/0006; B01J 35/002; B01J 35/04; B01J 37/0244; B01J 37/0248; B01D 53/9422; B01D 53/945; F01N 3/0842; F01N 3/2828
USPC ........ 502/302–304, 326–328, 332–334, 339, 502/349, 355, 439, 527.12, 527.13
See application file for complete search history.

(56) References Cited

U.S. PATENT DOCUMENTS

| | | | |
|---|---|---|---|
| 5,597,771 A * | 1/1997 | Hu ..................... | B01D 53/945 502/303 |
| 5,800,793 A | 9/1998 | Cole | |
| 5,874,057 A | 2/1999 | Deeba et al. | |
| 5,948,723 A * | 9/1999 | Sung ................... | B01D 53/945 502/302 |
| 6,292,739 B1 | 9/2001 | Yasui et al. | |
| 6,471,924 B1 | 10/2002 | Feeley et al. | |
| 6,499,294 B1 | 12/2002 | Katoh et al. | |
| 6,516,612 B1 | 2/2003 | Okada et al. | |
| 6,732,506 B2 | 5/2004 | Patterson et al. | |
| 6,764,665 B2 * | 7/2004 | Deeba ................. | B01D 53/865 423/213.5 |
| 6,794,330 B2 | 9/2004 | Tanada et al. | |
| 6,923,945 B2 * | 8/2005 | Chen ................... | B01D 53/945 423/239.1 |
| 7,022,646 B2 * | 4/2006 | Li ...................... | B01D 53/9422 502/339 |
| 7,056,859 B2 | 6/2006 | Hachisuka | |
| 7,276,212 B2 * | 10/2007 | Hu ..................... | B01D 53/9454 422/168 |
| 7,305,820 B2 | 12/2007 | Miyashita | |
| 7,329,629 B2 | 2/2008 | Gandhi et al. | |
| 7,344,684 B2 | 3/2008 | Kikuchi et al. | |
| 7,374,729 B2 * | 5/2008 | Chen ................... | B01D 53/945 422/177 |
| 7,501,098 B2 * | 3/2009 | Chen ................... | B01D 53/945 422/177 |
| 7,517,510 B2 * | 4/2009 | Chen ................... | B01D 53/945 422/168 |
| 7,550,124 B2 * | 6/2009 | Chen ................... | B01D 53/945 422/168 |
| 7,682,583 B2 | 3/2010 | Koo et al. | |
| 7,749,472 B2 * | 7/2010 | Chen ................... | B01D 53/945 423/213.2 |
| 7,758,834 B2 * | 7/2010 | Chen ................... | B01D 53/945 423/213.2 |
| 7,811,962 B2 * | 10/2010 | Hu ..................... | B01D 53/9454 502/304 |
| 7,870,724 B2 | 1/2011 | Ura et al. | |
| 7,879,755 B2 * | 2/2011 | Wassermann ........ | B01D 53/945 423/213.5 |
| 7,922,988 B2 * | 4/2011 | Deeba ................. | B01D 53/945 422/168 |
| 7,981,390 B2 * | 7/2011 | Galligan ............... | B01J 23/002 423/213.5 |
| 8,038,951 B2 * | 10/2011 | Wassermann ......... | B01J 21/066 422/168 |
| 8,173,087 B2 | 5/2012 | Wei et al. | |
| 8,617,496 B2 * | 12/2013 | Wei .................... | B01J 23/63 423/213.2 |
| 8,652,429 B2 * | 2/2014 | Sumiya ............... | B01J 37/0244 423/213.2 |
| 8,667,785 B2 * | 3/2014 | Blakeman ............ | B01J 35/0006 423/213.5 |
| 8,668,891 B2 * | 3/2014 | Blakeman ............ | F01N 3/103 423/213.5 |
| 8,828,343 B2 * | 9/2014 | Liu ..................... | B01D 53/945 423/213.5 |
| 8,833,064 B2 * | 9/2014 | Galligan ............. | B01D 53/945 423/213.5 |
| 8,950,174 B2 * | 2/2015 | Hilgendorff ......... | B01D 53/945 60/299 |
| 9,005,559 B2 * | 4/2015 | Sumiya ............... | B01J 37/0244 423/213.2 |
| 9,034,269 B2 * | 5/2015 | Hilgendorff ......... | B01J 37/0244 422/170 |
| 2006/0168949 A1 | 8/2006 | Xu et al. | |
| 2008/0044330 A1 * | 2/2008 | Chen ................... | B01D 53/945 423/213.5 |
| 2009/0257933 A1 | 10/2009 | Chen et al. | |
| 2009/0259332 A1 | 10/2009 | Chen et al. | |
| 2009/0320457 A1 | 12/2009 | Wan | |
| 2010/0104491 A1 | 4/2010 | Deeba | |
| 2010/0183490 A1 | 7/2010 | Hoke | |
| 2011/0305612 A1 | 12/2011 | Muller-Stach et al. | |
| 2012/0023915 A1 | 2/2012 | Hilgendorff | |

FOREIGN PATENT DOCUMENTS

| | | |
|---|---|---|
| KR | 10-0659581 | 12/2006 |
| WO | WO 03/068388 | 8/2003 |

OTHER PUBLICATIONS

Wunsch, Rolf, et al., Exhaust Gas Aftertreatment for BlueDIRECT Gasoline Engines with Lean Combustion—Potential for Future Applications, *21st Aachen Colloquium Automobile and Engine Technology* 2012, 1097-1116.

* cited by examiner

INTEGRATED LNT-TWC CATALYST

CROSS-REFERENCE TO RELATED APPLICATIONS

This application claims the benefit of priority under 35 U.S.C. §119(e) to U.S. Provisional Patent Application No. 61/968,669, filed on Mar. 21, 2014, which is hereby incorporated by reference in its entirety.

TECHNICAL FIELD

The present invention is directed to an exhaust gas purifying catalyst and methods for its use. More particularly, the invention pertains to a layered exhaust gas purifying catalyst that is capable of executing both a $NO_x$ absorbing function and a three-way conversion (TWC) function, the composite may be referred to as LNT-TWC. The exhaust gas purifying catalyst may be used to treat exhaust gas streams, especially those emanating from lean burn engines.

BACKGROUND

Emission of nitrogen oxides ($NO_x$) from lean burn engines must be reduced in order to meet emission regulation standards. Conventional three-way conversion (TWC) automotive catalysts are suitable for abating $NO_x$, carbon monoxide (CO), and hydrocarbon (HC) pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel (A/F) ratio of 14.65:1 (weight of air to weight of fuel) is the stoichiometric ratio corresponding to the combustion of a hydrocarbon fuel, such as gasoline, with an average formula $CH_{1.88}$. The symbol $\lambda$ is thus used to represent the result of dividing a particular A/F ratio by the stoichiometric A/F ratio for a given fuel, so that; $\lambda=1$ is a stoichiometric mixture, $\lambda>1$ is a fuel-lean mixture and $\lambda<1$ is a fuel-rich mixture.

Engines, especially gasoline-fueled engines to be used for passenger automobiles and the like, are being designed to operate under lean conditions as a fuel economy measure. Such future engines are referred to as "lean burn engines." That is, the ratio of air to fuel in the combustion mixtures supplied to such engines is maintained considerably above the stoichiometric ratio so that the resulting exhaust gases are "lean," i.e., the exhaust gases are relatively high in oxygen content. Although lean-burn engines provide advanced fuel economy, they have the disadvantage that conventional TWC catalysts are not effective for reducing $NO_x$ emissions from such engines because of excessive oxygen in the exhaust. Attempts to overcome this problem have included the use of a $NO_x$ trap. The exhaust of such engines is treated with a catalyst/$NO_x$ sorbent which stores $NO_x$ during periods of lean (oxygen-rich) operation, and releases the stored $NO_x$ during the rich (fuel-rich) periods of operation. During periods of rich (or stoichiometric) operation, the catalyst component of the catalyst/$NO_x$ sorbent promotes the reduction of $NO_x$ to nitrogen by reaction of $NO_x$ (including $NO_x$ released from the $NO_x$ sorbent) with HC, CO, and/or hydrogen present in the exhaust.

In a reducing environment, a lean $NO_x$ trap (LNT) activates reactions by promoting a steam reforming reaction of hydrocarbons and a water gas shift (WGS) reaction to provide $H_2$ as a reductant to abate $NO_x$. The water gas shift reaction is a chemical reaction in which carbon monoxide reacts with water vapor to form carbon dioxide and hydrogen. The presence of ceria in an LNT catalyzes the WGS reaction, improving the LNT's resistance to $SO_2$ deactivation and stabilizing the PGM. $NO_x$ storage (sorbent) components including alkaline earth metal oxides, such as oxides of Mg, Ca, Sr, and Ba, alkali metal oxides such as oxides of Li, Na, K, Rb, and Cs, and rare earth metal oxides such as oxides of Ce, La, Pr, and Nd in combination with precious metal catalysts such as platinum dispersed on an alumina support have been used in the purification of exhaust gas from an internal combustion engine. For $NO_x$ storage, baria is usually preferred because it forms nitrates at lean engine operation and releases the nitrates relatively easily under rich conditions. However, catalysts that use baria for $NO_x$ storage exhibit a problem in practical application, particularly when the catalysts are aged by exposure to high temperatures and lean operating conditions. After such exposure, such catalysts show a marked decrease in catalytic activity for $NO_x$ reduction, particularly at low temperature (200 to 350° C.) and high temperature (450° C. to 600° C.) operating conditions. $NO_x$ storage materials comprising barium ($BaCO_3$) fixed to ceria ($CeO_2$) have been reported, and these $NO_x$ materials have exhibited improved thermal aging properties.

To meet current governmental regulations (for example, Euro 6), catalytic converters must effectively convert hydrocarbons at low temperatures during lean operation, and they must effectively convert hydrocarbons and $NO_x$ under conditions favoring stoichiometric exhaust gas. An additional challenge is storing nitrogen oxides during lean operation and reducing these oxides during rich operation. Due to space limitations, however, using a separate TWC together with a separate LNT catalyst is not ideal. Thus, there is a need for a technology that balances standard TWC activity with LNT functionality, while alleviating the space concerns that occur when a separate TWC catalyst is used together with a separate LNT catalyst.

SUMMARY

A first embodiment pertains to a layered catalyst composite for an exhaust stream of an internal combustion engine, the layered catalyst composite comprising a catalytic material on a substrate, the catalytic material comprising at least two layers, wherein: the first layer comprises rare earth oxide-high surface area refractory metal oxide particles, an alkaline earth metal supported on the rare earth oxide-high surface area refractory metal oxide particles, and at least one first platinum group metal component supported on the rare earth oxide-high surface area refractory metal oxide particles; and the second layer comprises a second platinum group metal component supported on a first oxygen storage component (OSC) and/or a first refractory metal oxide support and, optionally, a third platinum group metal supported on a second refractory metal oxide support or a second oxygen storage component.

In a second embodiment, the layered catalyst composite of the first embodiment is modified, wherein the catalyst is effective to provide both lean $NO_x$ trap functionality and three-way conversion functionality.

In a third embodiment, the layered catalyst composite of the first and second embodiments is modified, wherein the first layer is disposed on the substrate that comprises a flow-through monolith and the second layer is disposed on the first layer.

In a fourth embodiment, the layered catalyst composite of the first and second embodiments is modified, wherein the second layer is disposed on the substrate that comprises a flow-through monolith and the first layer is disposed on the second layer.

In a fifth embodiment, the layered catalyst composite of the first through fourth embodiments is modified, wherein the substrate comprises a wall-flow filter and the first layer is on an inlet set of passages and the second layer is on an outlet set of passages.

In a sixth embodiment, the layered catalyst composite of the first through fourth embodiments is modified, wherein the substrate comprises a wall-flow filter and the first layer is on an outlet set of passages and the second layer is on an inlet set of passages.

In a seventh embodiment, the layered catalyst composite of the first through sixth embodiments is modified, wherein the layered catalyst composite is free of hydrocarbon trap material.

In an eighth embodiment, the layered catalyst composite of the first through seventh embodiments is modified, wherein the rare earth oxide-high surface area refractory metal oxide particles have a ceria phase present in a weight percent of the particles in the range of about 20% to about 80% on an oxide basis.

In a ninth embodiment, the layered catalyst composite of the first through eighth embodiments is modified, wherein the rare earth oxide-high surface area refractory metal oxide particles comprise ceria-alumina particles.

In a tenth embodiment, the layered catalyst composite of the first through ninth embodiments is modified, wherein the ceria-alumina particles have a ceria phase present in a weight percent of the particles in the range of about 20% to about 80% on an oxide basis.

In an eleventh embodiment, the layered catalyst composite of the first through tenth embodiments is modified, wherein the ceria-alumina particles are substantially free of alkaline earth metal.

In a twelfth embodiment, the layered catalyst composite of the first through eleventh embodiments is modified, wherein the first, second, and third platinum group metal components independently comprise platinum, palladium, and/or rhodium.

In a thirteenth embodiment, the layered catalyst composite of the first through twelfth embodiments is modified, wherein the first platinum group metal component comprises both palladium and platinum.

In a fourteenth embodiment, the layered catalyst composite of the first through thirteenth embodiments is modified, wherein the first platinum group metal component comprises platinum.

In a fifteenth embodiment, the layered catalyst composite of the first through fourteenth embodiments is modified, wherein the second platinum group metal component comprises palladium.

In a sixteenth embodiment, the layered catalyst composite of the first through fifteenth embodiments is modified, wherein the third platinum group metal component comprises rhodium.

In a seventeenth embodiment, the layered catalyst composite of the first through sixteenth embodiments is modified, wherein the first and second refractory metal oxide supports independently comprise a compound that is activated, stabilized, or both selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, alumina-ceria, and combinations thereof.

In an eighteenth embodiment, the layered catalyst composite of the first through seventeenth embodiments is modified, wherein the first and second oxygen storage components comprise a ceria-zirconia composite or a rare earth-stabilized ceria-zirconia.

In a nineteenth embodiment, the layered catalyst composite of the first through eighteenth embodiments is modified, wherein the first oxygen storage component and the second oxygen storage component comprise different ceria-zirconia composites, the first oxygen storage component comprising ceria in the range of 35 to 45% by weight and zirconia in the range of 43 to 53% by weight and the second oxygen storage component comprising ceria in the range of 15 to 25% by weight and zirconia in the range of 70 to 80% by weight.

In a twentieth embodiment, the layered catalyst composite of the first through nineteenth embodiments is modified, wherein the alkaline earth metal comprises barium.

In a twenty-first embodiment, the layered catalyst composite of the first through twentieth embodiments is modified, wherein the barium is present in an amount in the range of about 5% to 30% by weight on an oxide basis of the first layer.

In a twenty-second embodiment, the layered catalyst composite of the first through twenty-first embodiments is modified, wherein the second layer further comprises a second alkaline earth metal supported on the first refractory metal oxide support.

In a twenty-third embodiment, the layered catalyst composite of the twenty-second embodiment is modified, wherein the second alkaline earth metal comprises barium.

In a twenty-fourth embodiment, the layered catalyst composite of the twenty-third embodiment is modified, wherein the barium is present in an amount in the range of about 0% to about 10% by weight on an oxide basis of the second layer.

In a twenty-fifth embodiment, the layered catalyst composite of the first through twenty-fourth embodiments is modified, wherein under lean conditions, the layered catalyst composite is effective to simultaneously store $NO_x$, and to oxidize CO, HC, and NO to $NO_2$.

In a twenty-sixth embodiment, the layered catalyst composite of the first through twenty-fifth embodiments is modified, wherein under rich conditions, the layered catalyst composite is effective to simultaneously convert CO and HC and to release and reduce $NO_x$.

In a twenty-seventh embodiment, the layered catalyst composite of the first through twenty-sixth embodiments is modified, wherein under stoichiometric conditions, the layer catalyst composite is effective to simultaneously convert CO, HC, and $NO_x$.

In a twenty-eighth embodiment, the layered catalyst composite of the first embodiment is modified, wherein the catalyst composite is effective to provide both lean $NO_x$ trap functionality and three-way conversion functionality; the substrate comprises a flow-through carrier and the first layer is disposed on the substrate and the second layer is disposed on the first layer; the rare earth oxide-high surface area refractory metal oxide particles comprise ceria-alumina particles having a ceria phase present in a weight percent of the composite in the range of about 20% to about 80% on an oxide basis; the first platinum group metal component comprises palladium and/or platinum; the second platinum group metal component comprises palladium; and the third platinum group metal component comprises rhodium.

A twenty-ninth embodiment pertains to an exhaust gas treatment system comprising the layered catalyst composite of the first through twenty-eighth embodiments located downstream of an engine.

In a thirtieth embodiment, the exhaust gas treatment system of the twenty-ninth embodiment is modified, wherein the engine comprises a lean burn engine.

In a thirty-first embodiment, the exhaust gas treatment system of the thirtieth embodiment is modified, wherein the lean burn engine comprises a lean gasoline direct injection engine.

In a thirty-second embodiment, the exhaust gas treatment system of the twenty-ninth through thirty-first embodiments is modified, further comprising a catalyst selected from the group consisting of TWC, SCR, GPF, LNT, AMOx, SCR on a filter, and combinations thereof.

In a thirty-third embodiment, the exhaust gas treatment system of the twenty-ninth through thirty-second embodiments is modified, further comprising an SCR catalyst located downstream of the layered catalyst composite.

A thirty-fourth embodiment pertains to a method for treating a gas comprising hydrocarbons, carbon monoxide, and nitrogen oxides comprising: contacting the gas with the layered catalyst composite of the first through twenty-seventh embodiments, wherein: under lean conditions, the layered catalyst composite is effective to simultaneously store $NO_x$, and to oxidize CO, HC, and NO; under rich conditions, the layered catalyst composite is effective to simultaneously convert CO and HC and to release and reduce $NO_x$; and under stoichiometric conditions, the layered catalyst composite is effective to simultaneously convert CO, HC, and $NO_x$.

A thirty-fifth embodiment pertains to a method of making a layered catalyst composite, the method comprising providing a carrier and coating the carrier with first and second layers of catalytic material; the first layer comprising rare earth oxide-high surface area refractory metal oxide particles, an alkaline earth metal supported on the rare earth oxide-high surface area refractory metal oxide particles, and at least one first platinum group metal component supported on the rare earth oxide-high surface area refractory metal oxide particles, the second layer being the outermost layer of the composite, comprising a second platinum group metal component supported on a first oxygen storage component (OSC) or a first refractory metal oxide support and a third platinum group metal component supported on a second refractory metal oxide support or a second oxygen storage component.

DETAILED DESCRIPTION

Figure 1:
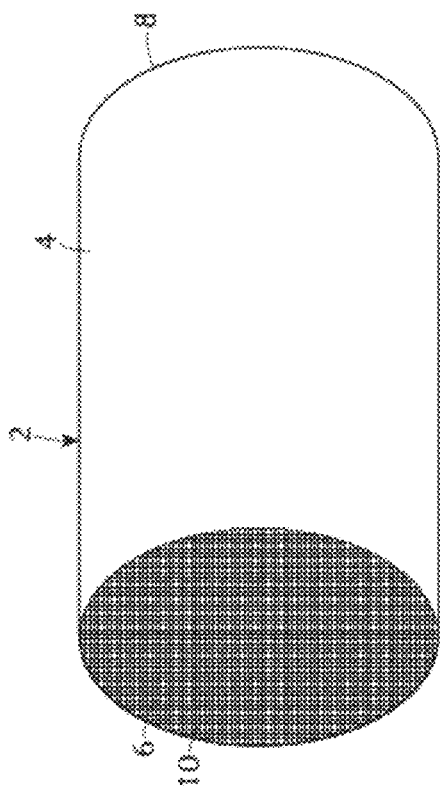
FIG. 1 is a perspective view of a honeycomb-type refractory substrate member which may comprise a layered catalyst composite according to an embodiment.

Before describing several exemplary embodiments of the invention, it is to be understood that the invention is not limited to the details of construction or process steps set forth in the following description. The invention is capable of other embodiments and of being practiced or being carried out in various ways.

According to embodiments of the invention, provided is a layered catalyst composite for an exhaust stream of an internal combustion engine that balances TWC activity and LNT functionality. In lean operation, the catalyst composite allows for conversion of carbon monoxide (CO) and hydrocarbons (HC) and storage of $NO_x$. In rich operation, the catalyst is effective to convert CO and HC and to release and reduce $NO_x$. In stoichiometric operation, the catalyst composite allows for simultaneous conversion of CO, HC, and $NO_x$.

In one or more embodiments, a layered catalyst composite comprises a catalytic material on a substrate. The catalytic material comprises at least two layers, a first layer and a second layer. The first layer comprises rare earth oxide-high surface area refractory metal oxide particles, an alkaline earth metal supported on the rare earth oxide-high surface area refractory metal oxide particles, and at least one first platinum group metal component supported on the rare earth oxide-high surface area refractory metal oxide particles. The second layer comprises a second platinum group metal component supported on a first oxygen storage component (OSC) and/or a first refractory metal oxide support and, optionally, a third platinum group metal supported on a second refractory metal oxide support or a second oxygen storage component With respect to the terms used in this disclosure, the following definitions are provided.

As used herein, the terms "catalyst" or "catalyst material" or "catalytic material" refer to a material that promotes a reaction. As used herein, the term "catalyst composite" refers to a catalytic article including a carrier substrate, for example a honeycomb substrate, having one or more washcoat layers containing a catalytic material, for example, a PGM component that is effective to catalyze oxidation of CO, HC, and NO.

As used herein, the terms "layer" and "layered" refer to a structure that is supported on a surface, e.g. a substrate. In one or more embodiments, the layered catalyst composite of the present invention comprises two distinct layers coated on a single substrate or substrate member, one layer (e.g., the first or the second layer) over top of the other (e.g., the second or the first layer). In one or more embodiments, the first layer is coated over the entire axial length of a substrate (e.g., a flow-through monolith) and the second layer is coated over the entire axial length of the first layer. In other embodiments, the second layer is disposed on a substrate, and the first layer is disposed on the second layer. In one or more embodiments, the first and second layers are washcoats.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat.

As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, bulk ceria, zirconia, alpha alumina, silica, titania, and other materials are known for such use.

One or more embodiments of the present invention include a refractory metal oxide support comprising an activated compound selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, ceria, alumina-ceria, and combinations thereof. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

In one or more embodiments, the first and second refractory metal oxide supports independently comprise a compound that is activated, stabilized, or both, selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, ceria, alumina-ceria, and combinations thereof. In specific embodiments, the second refractory metal oxide comprises alumina.

As used herein, the term "space velocity" refers to the quotient of the entering volumetric flow rate of the reactants divided by the reactor volume (or the catalyst bed volume) which indicates how many reactor volumes of feed can be treated in a unit time. Space velocity is commonly regarded as the reciprocal of the reactor space time.

As used herein, the term "rare earth oxide-high surface area refractory metal oxide particles" refers to a mixture of rare earth oxide and high surface area refractory metal oxide particles that are employed as a carrier for catalytic components. In one or more embodiments, the rare earth oxide is selected from at least one oxide of a rare earth metal selected from Ce, Pr, Nd, Eu, Sm, Yb, and La, and mixtures thereof. In some embodiments, the rare earth oxide can be mixed with one or more other components such as lanthanum, praseodymium, neodymium, niobium, platinum, palladium, rhodium, iridium, osmium, ruthenium, tantalum, zirconium, hafnium, yttrium, nickel, manganese, iron, copper, silver, gold, gadolinium, and combinations thereof. In one or more embodiments, the high surface area refractory metal oxide comprises any high surface area refractory metal oxide known in the art. For example, the high surface area refractory metal oxide can comprise one or more of alumina, zirconia, alumina-zirconia, lanthana-alumina, lanthana-zirconia-alumina, baria-alumina, baria-lanthana-alumina, baria-lanthana-neodymia-alumina, alumina-chromia, ceria, and alumina-ceria. In one or more embodiments, the rare earth oxide-high surface area refractory metal oxide particles comprise ceria-alumina particles. In specific embodiments, the ceria-alumina particles have a ceria phase present in a weight percent of the first layer in the range of about 20% to about 80% on an oxide basis, including 20%, 25%, 30%, 35%, 40%, 45%, 50%, 55%, 60%, 65%, 70%, 75%, or 80%. In one or more specific embodiments, the average $CeO_2$ crystallite size of the fresh and aged samples, obtained from XRD, can be used as a measurement for $CeO_2$ hydrothermal stability. Accordingly, in one or more embodiments, the $CeO_2$ is present in the form of crystallites that are hydrothermally stable and have an average crystallite size of less than 130 Å after aging at 950° C. for 5 hours in 2% $O_2$ and 10% steam in $N_2$. In a specific embodiment, the ceria-alumina particles include a ceria phase present in a weight percent of the composite in an amount of about 50% on an oxide basis. In other specific embodiments, the ceria-alumina particles include a ceria phase present in a weight percent of the composite in an amount of about 30% on an oxide basis.

In one or more embodiments, the $CeO_2$ is present in the form of crystallites that are hydrothermally stable and are resistant to growth into larger crystallites upon aging at 950° C. As used herein, the term "resistant to growth" means that the crystallites upon aging grow to a size no larger than an average of 130 Å. In a specific embodiment, the $CeO_2$ crystallite size, as determined by XRD, after aging the catalytic article at 950° C. for 5 hours in 2% $O_2$ and 10% steam/$N_2$ is less than 130 Å. According to one or more embodiments, the $CeO_2$ crystallite size of the powder samples and the coated catalysts are different. In the coated catalysts, other washcoat components may have a stabilization effect on $CeO_2$. Therefore, after the same 950° C. aging, the $CeO_2$ crystallite size of the coated catalyst is smaller than that of the powder.

As used herein, the term "average crystallite size" refers to the mean size as determined by XRD described below.

As used herein, the term "XRD" refers to x-ray diffraction crystallography, which is a method of determining the atomic and molecular structure of a crystal. In XRD, the crystalline atoms cause a beam of x-rays to diffract into many specific directions. By measuring the angles and intensities of these diffracted beams, a three-dimensional image of the density of electrons within the crystal can be produced. From this electron density, the position of the atoms in the crystal can be determined, as well as their chemical bonds, their disorder, and other information. In particular, XRD can be used to estimate crystallite size; the peak width is inversely proportional to crystallite size; as the crystallite size gets smaller, the peak gets broader. In one or more embodiments, XRD is used to measure the average crystallite size of the $CeO_2$ particles.

The width of an XRD peak is interpreted as a combination of broadening effects related to both size and strain. The formulas used to determine both are given below. The first equation below is the Scherrer equation which we use to transform full width at half maximum intensity, FWHM, information into a crystallite size for a given phase. The second equation is used to calculate strain in a crystal from peak width information and the total width or breadth of a peak considered to be a sum of these two effects as shown in the third equation. It should be noticed that size and strain broadening vary in different fashions with regard to the Bragg angle θ. The constants for the Scherrer equation are discussed below.

$$\beta_L = \frac{K\lambda}{L\cos\theta}$$

$$\beta_e = C\varepsilon\tan\theta$$

$$\beta_{tot} = \beta_e + \beta_L = C\varepsilon\tan\theta + \frac{K\lambda}{L\cos\theta}$$

The constants for the Scherrer equation are

K: shape constant, we use a value of 0.9

L: the peak width, this is corrected for the contribution from the instrumental optics through the use of NIST SRM 660b LaB6 Line Position & Line Shape Standard Θ: ½ of the 2θ value of the reflection of interest λ: wavelength of radiation 1.5406 Å

Crystallite size is understood to be the length of the coherent scattering domain in a direction orthogonal to the set of lattice planes which give rise to the reflection. For $CeO_2$, the $CeO_2$ 111 reflection is the most intense peak in the X-ray diffraction pattern of $CeO_2$. The $CeO_2$ (111) plane of atoms intersects each of the crystallographic axes at unity and is orthogonal to the body diagonal represented by the <111> vector. So, a crystallite size of 312 Å calculated from the FWHM of the $CeO_2$ 111 reflection would be considered to be roughly 100 layers of the (111) plane of atoms.

Different directions, and thus reflections, in a crystal will generate different though close crystallite size values. The values will be exact only if the crystal is a perfect sphere. A Williamson Hall plot is used to interpret size and strain effects by considering the total peak breadth as a linear equation below with the slope of the line representing strain and the intercept being the size of a crystal.

$$\beta_{tot}\cos\theta = C\varepsilon\sin\theta + \frac{K\lambda}{L}$$

To determine the crystallite size of a material we need to determine the FWHM value of a single reflection or from the complete X-ray diffraction pattern. Traditionally we have fit a single reflection to determine the FWHM value of that reflection, corrected the FWHM value for the contribution from the instrument, and then converted the corrected FWHM value into a crystallite size value using the Scherrer equation. This would be done by ignoring any effect from strain in the crystal. We have used this method primarily for questions concerning the crystallite size of precious metals for which we have only a single useful reflection. It should be noted that in fitting peaks it is desired to have a clean reflection which is not overlapped by reflections from other phases. This is rarely the case with our present washcoat formulations so we have shifted to using Rietveld methods. Rietveld methods allow us to fit complex X-ray diffraction patterns using the known crystal structures of the phases present. The crystal structures act as restraints or brakes on the fitting process. Phase content, lattice parameters, and FWHM information are varied for each phase until the overall model matches the experimental data.

In the Examples below, Rietveld methods were used to fit experimental patterns for fresh and aged samples. A FWHM curve determined for each phase in each sample was used to determine a crystallite size. Strain effects were excluded.

As used herein, the term "alkaline earth metal" refers to one or more chemical elements defined in the Periodic Table of Elements, including beryllium (Be), magnesium (Mg), calcium (Ca), strontium (Sr), barium (Ba), and radium (Ra). In one or more embodiments, the first layer comprises an alkaline earth metal. In one or more embodiments, the alkaline earth metal in the first layer can comprise beryllium (Be), magnesium (Mg), calcium (Ca), strontium (Sr), barium (Ba), and radium (Ra). In specific embodiments, the alkaline earth metal in the first layer comprises barium. The alkaline earth metal can be present in the first layer in an amount in the range of about 5% to 30% by weight on an oxide basis, based on the weight of the first layer. In a specific embodiment, in the first layer, the alkaline earth metal comprises barium, which is present in an amount in the range of about 5% to about 30% by weight on an oxide basis. In one or more embodiments, the alkaline earth metal can be incorporated into the layer as a salt (e.g., $BaCO_3$).

In one or more embodiments, without intending to be bound by theory, it is thought that the additional ceria surface area resulting from smaller crystallite sizes allows for higher $BaCO_3$ based $NO_x$ trapping due to better $BaCO_3$ dispersing, higher $CeO_2$ based $NO_x$ trapping at low temperature, improved $NO_x$ reduction due to more efficient WGS, and improved NO oxidation and $NO_x$ reduction due to better PGM dispersion. Thus, incorporating barium ($BaCO_3$) into ceria-alumina ($CeO_2/Al_2O_3$) has a tremendous stabilization effect on $CeO_2$ and provides an LNT catalyst material in the first layer with improved hydrothermal stability, higher $NO_x$ trapping capacity, and higher $NO_x$ conversion than traditional LNT technologies.

In one or more embodiments, the composite of $CeO_2$ and $Al_2O_3$ in the first layer contains ceria in an amount in the range of 20 to 80% by weight on an oxide basis, including 20%, 25%, 30%, 35%, 40%, 45%, 50%, 55%, 60%, 65%, 70%, 75%, or 80%.

As used herein, the term "platinum group metal" or "PGM" refers to one or more chemical elements defined in the Periodic Table of Elements, including platinum (Pt), palladium, rhodium, osmium, iridium, and ruthenium, and mixtures thereof. In one or more embodiments, the first layer comprises at least one first platinum group metal supported on the rare earth oxide-high surface area refractory metal oxide particles (e.g. ceria-alumina). In one or more embodiments, the first platinum group metal is selected from the group consisting of platinum, palladium, rhodium, and mixtures thereof. In a specific embodiment, the first platinum group metal component comprises both palladium and platinum. In other embodiments, the first platinum group metal comprises platinum only. In a very specific embodiment, the first layer comprises Pt/Pd supported on $BaCO_3/(CeO_2—Al_2O_3)$ particles. In another specific embodiment, the first layer comprises Pt supported on $BaCO_3/(CeO_2—Al_2O_3)$ particles.

Generally, there are no specific restrictions as far as the platinum to palladium weight ratio of the first layer is concerned. Generally, there are no specific restrictions as far as the palladium content of the first layer is concerned. There are also no specific restrictions as far as the platinum content of the first layer is concerned.

Generally, there are no specific restrictions as far as the total platinum group metal content of the layered catalyst composite is concerned. In one or more embodiments, the first layer comprises platinum and palladium, and the second layer comprises palladium and rhodium. Generally, there are no specific restrictions as far as the total platinum group metal content of the layered catalyst composite is concerned.

In one or more embodiments, the second layer comprises a second platinum group metal component supported on a first oxygen storage component (OSC) and/or a first refractory metal oxide support and, optionally, a third platinum group metal supported on a second refractory metal oxide support or a second oxygen storage component. In one or more embodiments, the second platinum group metal component is selected from platinum, palladium, rhodium, or mixtures thereof. In specific embodiments, the second platinum group metal component comprises palladium. Generally, there are no specific restrictions as far as the palladium content of the second layer is concerned.

In one or more embodiments, the second layer does not comprise a third platinum group metal. In one or more embodiments, when present, the third platinum group metal is selected from platinum, palladium, rhodium, and mixtures thereof. In specific embodiments, the third platinum group metal component comprises rhodium. Generally there are no specific restrictions as far as the rhodium content of the second layer is concerned.

In one or more embodiments, the first layer comprises barium in amount in the range of about 5% to 30% by weight on an oxide basis of the first layer. In a specific embodiment, the first layer comprises Pt/Pd supported on $BaCO_3$/($CeO_2$—$Al_2O_3$) particles.

As used herein, the term "oxygen storage component" (OSC) refers to an entity that has a multi-valence state and can actively react with reductants such as carbon monoxide (CO) or hydrogen under reduction conditions and then react with oxidants such as oxygen or nitrous oxides under oxidative conditions. Examples of suitable oxygen storage components comprise the rare earth oxides, particularly ceria. The OSC can also comprise one or more of lanthana, praseodymia, neodynmia, niobia, europia, samaria, ytterbia, yttria, zirconia, and mixtures thereof in addition to ceria. The rare earth oxide may be in bulk (e.g. particulate) form. The oxygen storage component can include cerium oxide (ceria, $CeO_2$) in a form that exhibits oxygen storage properties. The lattice oxygen of ceria can react with carbon monoxide, hydrogen, or hydrocarbons under rich A/F conditions. Upon lean exposure, the reduced ceria has the ability to recapture oxygen from air and/or $NO_x$ species, thus promoting conversion of $NO_x$.

In one or more embodiments, the first and second oxygen storage components comprise a ceria-zirconia composite or a rare earth-stabilized ceria-zirconia. In specific embodiments, the first oxygen storage component and the second oxygen storage component comprise different ceria-zirconia composites. Specifically, the first oxygen storage component comprises ceria in the range of 35 to 45% by weight and zirconia in the range of 43 to 53% by weight, and the second oxygen storage component comprises ceria in the range of 15 to 25% by weight and zirconia in the range of 70 to 80% by weight.

According to one or more embodiments, the layered catalyst composite of the present invention is free of hydrocarbon trap material. As used herein, the term "free of hydrocarbon trap material" means that no hydrocarbon trap material has been intentionally added to the layered catalyst composite. As used herein, the term "hydrocarbon trap material" refers to a material that has the ability to reversibly trap hydrocarbons, particularly, hydrocarbon emissions produced during the cold start period. In one or more embodiments, the layered catalyst composite contains less than 1% of hydrocarbon trap material.

Typically, the layered catalyst composite of the present invention is disposed on a substrate. The substrate may be any of those materials typically used for preparing catalysts, and will typically comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The cells can have cross sections that are rectangular, square, circular, oval, triangular, hexagonal, or are of other polygonal shapes. The ceramic substrate may be made of any suitable refractory material, e.g., cordierite, cordierite-alumina, silicon nitride, or silicon carbide, or the substrates may be composed of one or more metals or metal alloys.

The layered catalyst composite according to embodiments of the present invention can be applied to the substrate surfaces by any known means in the art. For example, the catalyst washcoat can be applied by spray coating, powder coating, or brushing or dipping a surface into the catalyst composition.

In one or more embodiments, the layered catalyst composite is disposed on a honeycomb substrate.

Figure 2:
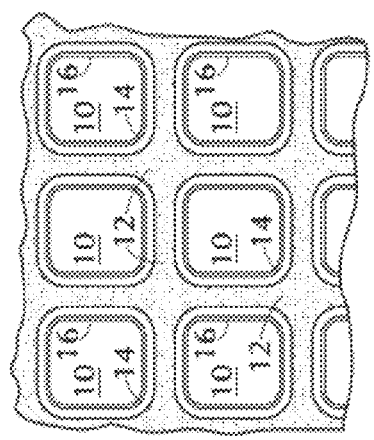
FIG. 2 is a partial cross-sectional view enlarged relative to FIG. 1 and taken along a plane parallel to the end faces of the substrate of FIG. 1, which shows an enlarged view of one of the gas flow passages shown in FIG. 1.

The washcoat composition of this invention may be more readily appreciated by reference to FIGS. 1 and 2. FIGS. 1 and 2 show a refractory substrate member 2, in accordance with one embodiment of the present invention. Referring to FIG. 1, the refractory substrate member 2 is a cylindrical shape having a cylindrical outer surface 4, an upstream end face 6 and a downstream end face 8, which is identical to end face 6. Substrate member 2 has a plurality of fine, parallel gas flow passages 10 formed therein. As seen in FIG. 2 flow passages 10 are formed by walls 12 and extend through substrate from upstream end face 6 to downstream end face 8, the passages 10 being unobstructed so as to permit the flow of a fluid, e.g., a gas stream, longitudinally through substrate via gas flow passages 10 thereof. A discrete bottom layer 14, which in the art and sometimes below is referred to as a "washcoat", is adhered or coated onto the walls 12 of the substrate member. As shown in FIG. 2, a second discrete top washcoat layer 16 is coated over the bottom washcoat layer 14. In one or more embodiments, the first layer is the bottom washcoat layer 14, and the second layer is the top washcoat layer 16. In other embodiments, the second layer is the bottom washcoat layer 14, and the first layer is the top washcoat layer 16.

As shown in FIG. 2, the substrate member includes void spaces provided by the gas-flow passages 10, and the cross-sectional area of these passages 10 and the thickness of the walls 12 defining the passages will vary from one type of substrate member to another. Similarly, the weight of washcoat applied to such substrates will vary from case to case. Consequently, in describing the quantity of washcoat or catalytic metal component or other component of the composition, it is convenient to use units of weight of component per unit volume of substrate. Therefore, the units of grams per cubic inch ("g/in$^3$") and grams per cubic foot ("g/ft$^3$") are used herein to mean the weight of a component per volume of the substrate member, including the volume of void spaces of the substrate member.

During operation, exhaust gaseous emissions from a lean burn engine comprising hydrocarbons, carbon monoxide, nitrogen oxides, and sulfur oxides initially encounter the top washcoat layer 16, and thereafter encounter the bottom washcoat layer 14.

In one embodiment, the layered catalyst composite of the present invention comprises two distinct layers coated on a single substrate or substrate member, one layer (e.g., the second layer) over top of the other (e.g., the first layer). In this embodiment, the first layer is coated over the entire axial length of a substrate (e.g., a flow-through monolith) and the second layer is coated over the entire axial length of the first layer.

In one or more embodiments, the improved $NO_x$ conversion upon high temperature severe aging allows the placement of the layered catalyst composite according to one or more embodiments in a close-coupled position, which is beneficial for reducing system $N_2O$ emissions because $N_2O$ formation decreases with temperature increasing.

According to one or more embodiments, the layered catalyst composite is effective to provide both lean $NO_x$ trap (LNT) functionality and three-way conversion (TWC) functionality. As used herein, the term "conversion" encompasses both the chemical conversion of emissions to other compounds, as well as the trapping of emissions by chemical and/or adsorptive binding to an appropriate trapping material. As used herein, the term "emissions" refers to exhaust gas emissions, more specifically to exhaust gas emissions comprising $NO_x$, CO, and hydrocarbons.

In a specific embodiment, the substrate comprises a flow-through carrier, and the first layer is disposed on the substrate, and the second layer is disposed on top of the first layer. The first layer comprises ceria-alumina particles having a ceria phase present in a weight percent of the composite in the range of about 20% to about 80% on an oxide basis, the ceria-alumina particles having barium supported on the particles, and platinum and palladium supported thereon. The second layer comprises Pd supported on a ceria-zirconia composite and Rh supported on alumina.

Catalytic converters must effectively convert hydrocarbons at low temperatures during lean operation. The same also applies to hydrocarbons (HCs) and nitrogen oxides ($NO_x$) under conditions favoring stoichiometric exhaust gas, which can occur during the cold-start phase as well as during operation. An additional challenge is storing nitrogen oxides during lean combustion and reducing these oxides during rich combustion. In order to utilize lean combustion as far as possible, $NO_x$ storage must be possible in a large temperature range.

Thus, the layered catalyst composite of the present invention is effective to provide both lean $NO_x$ trap functionality (LNT) and three-way conversion (TWC) functionality. In one or more embodiments, the layered catalyst composite of the present invention is effective to simultaneously store $NO_x$, and to oxidize CO, HC, and NO to $NO_2$. According to one or more embodiments, under rich conditions, the layered catalyst composite is effective to simultaneously convert CO and HC and to release and reduce $NO_x$, and under stoichiometric conditions, the layered catalyst composite is effective to simultaneously convert CO, HC, and $NO_x$.

Occasionally, particulates are present in the exhaust gas stream and the layered catalyst composites may also provide the ability to oxidize any particulates.

The layered catalyst composite of the present invention can be used in an integrated emission treatment system comprising one or more additional components for the treatment of exhaust gas emissions. Thus, a second aspect of the present invention is directed to an exhaust gas treatment system. In one or more embodiments, the exhaust gas treatment system comprises an engine and the layered catalyst composite of the present invention. In specific embodiments, the engine is a lean burn engine. In other specific embodiments, the engine is a lean gasoline direct injection engine. In one or more embodiments, the exhaust gas treatment system comprises a lean burn engine upstream from the layered catalyst composite of one or more embodiments. The exhaust gas treatment system may further comprise a catalyst, and optionally, a particulate filter. In one or more embodiments, the catalyst is selected from the group consisting of TWC, SCR, GPF, LNT, AMOx, SCR on a filter, and combinations thereof. The layered catalyst composite can be located upstream or downstream of the catalyst. In one or more embodiments, the catalyst is a SCR catalyst located downstream of the layer catalyst composite. In one or more embodiments, the particulate filter can be selected from a gasoline particulate filter, a soot filter, or a SCR on a filter. The particulate filter may be catalyzed for specific functions. The layered catalyst composite can be located upstream or downstream of the particulate filter.

In a specific embodiment, the particulate filter is a catalyzed soot filter (CSF). The CSF can comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. In one or more embodiments, the soot burning catalyst is an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being specifically exemplified. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

A third aspect of the present invention is directed to a method of treating a gas comprising hydrocarbons (HC), carbon monoxide (CO), and nitrogen oxides ($NO_x$). In one or more embodiments, the method comprises contacting the gas with the layered catalyst composite of the present invention. In specific embodiments, under lean conditions, the layered catalyst composite is effective to simultaneously store $NO_x$, and to oxidize CO, HC, and NO; under rich conditions, the layered catalyst composite is effective to simultaneously convert CO and HC and to release and reduce $NO_x$; and under stoichiometric conditions, the layered catalyst composite is effective to simultaneously convert CO, HC, and $NO_x$.

A further aspect of the present invention is directed to a method of making a layered catalyst composite. In one or more embodiments, the method comprises providing a carrier and coating the carrier with first and second layers of catalytic material. In specific embodiments, the first layer comprises rare earth oxide-high refractory metal oxide particles, an alkaline earth metal supported on the rare earth oxide-high refractory metal oxide particles, and at least one first platinum group metal component supported on the rare earth oxide-high refractory metal oxide particles. The second layer, being the outermost layer of the composite, comprises a second platinum group metal component supported on a first oxygen storage component (OSC) or a first refractory metal oxide support and a third platinum group metal component supported on a second refractory metal oxide support or a second oxygen storage component.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Preparation of LNT-TWC Catalyst

To demonstrate the advantage of this invention, an example of a LNT-TWC catalyst was prepared. This two layer formulation, which comprises an undercoat washcoat layer and a top washcoat layer, was coated onto a flow-through ceramic monolith substrate carrier having a cell density of 400 cells per square inch (cpsi) and a 4 mil wall thickness, the top washcoat layer being coated over the undercoat washcoat layer. The catalyst has a total 185 g/ft³ PGM nominal loading with a Pt/Pd/Rh ratio of 63/117/5.

Undercoat Washcoat Layer

The $CeO_2$—$Al_2O_3$ particles comprising 50 wt. % of $CeO_2$ and 50 wt. % of $Al_2O_3$ were impregnated with a solution of barium acetate such that the $BaCO_3/(CeO_2$—$Al_2O_3)$ composite had a $BaCO_3$ content of about 26 wt. %. The mixture was dried at 110° C. and calcined at 720° C. for 2 hours. Pd in the form of palladium nitrate and Pt in the form of platinum amine solution were introduced onto the support material $BaCO_3/(CeO_2$—$Al_2O_3)$ by conventional incipient wetness impregnation. A slurry mixture containing about 87 wt. % of $BaCO_3/(CeO_2$—$Al_2O_3)$, 1 wt. % of Pt, 0.1 wt. % of Pd, magnesium acetate to yield 7 wt. % of MgO, zirconium acetate to yield 4 wt. % of $ZrO_2$, was coated onto ceramic honeycomb substrates. The total washcoat loading of the undercoat layer after 550° C. calcination for one hour in air was about 3.4 g/in³.

Topcoat Layer

The top layer was disposed on the undercoat layer. Pd in the form of palladium nitrate was introduced onto the OSC material and Rh in the form of rhodium nitrate was introduced onto the activated γ-alumina. A slurry mixture containing about 15 wt. % of activated γ-alumina, 76 wt. % of OSC material ($CeO_2/ZrO_2$) with promoters, 2 wt. % of Pd, 0.1 wt. % of Rh, barium acetate to yield 5 wt. % of $BaCO_3$, zirconium acetate to yield 2 wt. % of $ZrO_2$, was coated over the entire undercoat layer. The total washcoat of the top layer after 550° C. calcination was about 3.0 g/in³.

Example 2

Preparation of LNT-TWC Catalyst

To demonstrate the advantage of this invention, an example of a LNT-TWC catalyst was prepared. This two layer formulation, which comprises an undercoat washcoat layer and a top washcoat layer, was coated onto a flow-through ceramic monolith substrate carrier having a cell density of 400 cells per square inch (cpsi) and a 4 mil wall thickness, the top washcoat layer being coated over the undercoat washcoat layer. The catalyst has a total 185 g/ft3 PGM nominal loading with a Pt/Pd/Rh ratio of 63/117/5.

Undercoat Washcoat Layer

The $CeO_2$—$Al_2O_3$ particles comprising 30 wt. % of $CeO_2$ and 70 wt. % of $Al_2O_3$ were impregnated with a solution of barium acetate such that the $BaCO_3/(CeO_2$—$Al_2O_3)$ composite had a $BaCO_3$ content of about 13 wt. %. The mixture was dried at 110° C. and calcined at 720° C. for 2 hours. Pd in the form of palladium nitrate and Pt in the form of platinum amine solution were introduced onto the support material $BaCO_3/(CeO_2$—$Al_2O_3)$ by conventional incipient wetness impregnation. A slurry mixture containing about 87 wt. % of $BaCO_3/(CeO_2$—$Al_2O_3)$, 1 wt. % of Pt, 0.1 wt. % of Pd, magnesium acetate to yield 7 wt. % of MgO, zirconium acetate to yield 4 wt. % of $ZrO_2$, was coated onto ceramic honeycomb substrates. The total washcoat loading of the undercoat layer after 550° C. calcination for one hour in air was about 3.4 g/in³.

Topcoat Layer

The top layer was disposed on the undercoat layer. Pd in the form of palladium nitrate was introduced onto the OSC material and Rh in the form of rhodium nitrate was introduced onto the activated γ-alumina. A slurry mixture containing about 18 wt. % of activated γ-alumina, 70 wt. % of OSC material ($CeO_2/ZrO_2$) with promoters, 2.7 wt. % of Pd, 0.1 wt. % of Rh, barium acetate to yield 8.6 wt. % of $BaCO_3$, zirconium acetate to yield 2 wt. % of $ZrO_2$, was coated over the entire undercoat layer. The total washcoat of the top layer after 550° C. calcination was about 2.4 g/in³.

Example 3

Preparation of LNT Catalyst (Comparative)

To demonstrate the advantage of this invention, a comparative example of a state-of-art LNT catalyst was prepared. This two layer formulation, which comprises an undercoat washcoat layer and a top washcoat layer, was coated onto a flow-through ceramic monolith substrate carrier having a cell density of 400 cells per square inch (cpsi) and a 4 mil wall thickness, the top washcoat layer being coated over the undercoat washcoat layer. The catalyst has a total 120 g/ft³ PGM nominal loading with a Pt/Pd/Rh ratio of 103/12/5, which is cost equivalent to Examples 1, 2, and 7 at 185 g/ft³ PGM nominal loading with a Pt/Pd/Rh ratio of 63/117/5.

The undercoat layer contains an activated γ-alumina, cerium oxide, barium carbonate, magnesia, zirconia, platinum, and palladium at concentrations of approximately 38%, 41%, 14%, 6%, 2%, 0.7% and 0.09%, respectively, based on the calcined weight of the catalyst. Pd in the form of palladium nitrate and Pt in the form of platinum amine solution were introduced onto the support material by conventional incipient wetness techniques. The total washcoat loading of the undercoat layer after 550° C. calcination for one hour in air was about 5.3 g/in³.

The topcoat layer, which is disposed on the undercoat layer, contains an activated γ-alumina, cerium oxide, platinum, palladium and rhodium at concentrations of approximately 57%, 41%, 2%, 0.2 and 0.2%, respectively, based on the calcined weight of the catalyst. Pt in the form of platinum amine solution and Pd in the form of palladium nitrate solution were introduced onto γ-alumina, and Rh in the form of rhodium nitrate was introduced onto ceria by conventional incipient wetness techniques. The topcoat layer was coated over the entire undercoat layer. The total washcoat of the topcoat layer after 550° C. calcination was about 1.23 g/in³.

Example 4

Preparation of TWC Catalyst (Comparative)

To demonstrate the advantage of this invention, a comparative example of a state-of-art TWC catalyst was prepared. This single layer formulation was coated onto a flow-through ceramic monolith substrate carrier having a cell density of 400 cells per square inch (cpsi) and a 4 mil wall thickness. The catalyst has a total 248 g/ft³ PGM nominal loading with a Pt/Pd/Rh ratio of 24/220/4, which is cost equivalent to Examples 1, 2, and 7 at 185 g/ft³ PGM nominal loading with a Pt/Pd/Rh ratio of 63/117/5.

The catalyst washcoat contains an activated γ-alumina, OSC material ($CeO_2/ZrO_2$) with promoters, barium carbonate, zirconia, platinum, palladium and rhodium at concentrations of approximately 36%, 56%, 4%, 1%, 0.3%, 3% and 0.06%, respectively, based on the calcined weight of the catalyst. The total washcoat loading after 550° C. calcination for one hour in air was about 4.0 g/in³.

Example 5

Cycle $NO_x$ Conversion and $NO_x$ Trapping Capacity Testing $NO_x$ trapping and reduction activity of Examples 1, 2, and 3 were evaluated in fresh and after aging at 950° C. for 5 hours in 2% $O_2$ and 10% steam in $N_2$. The catalysts were evaluated on a reactor test rig with FTIR analytical apparatus. The evaluations were conducted with 10 cycles comprising a 120 seconds lean gas exposure and a 5 seconds rich gas exposure. A purging with a gas mixture of $CO_2$, $H_2O$ and $N_2$ is applied between lean gas exposure and rich gas exposure for the evaluations at 200, 250, 300, 350, and 400° C. in 10, 10, 6, 4, and 4 seconds, respectively. After lean/rich cycles, the catalyst was regenerated in rich gas for 1 minute, and then exposed to lean gas. The feeding gas compositions and space velocities at each testing temperatures are listed in Table 1.

TABLE 1

| | Temperature, ° C. | | | | | | | | | | | |
|---|---|---|---|---|---|---|---|---|---|---|---|---|
| | 200 and 250 | | 300 | | 350 | | 400 | | 450 | | 500 | |
| | SV, hr⁻¹ | | | | | | | | | | | |
| | 25,000 | | 40,000 | | 55,000 | | 70,000 | | 55,000 | | 80,000 | |
| | Lean | Rich | Lean | Rich | Lean | Rich | Lean | Rich | Lean | Rich | Lean | Rich |
| $O_2$, % | 13 | 0 | 11 | 0 | 11 | 0 | 6 | 0 | 11 | 0 | 6 | 0 |
| $CO_2$, % | 4.15 | 4.15 | 4.15 | 4.15 | 5 | 5 | 5 | 5 | 5 | 5 | 5 | 5 |
| NO, ppm | 300 | 0 | 300 | 0 | 300 | 0 | 300 | 0 | 300 | 0 | 300 | 0 |
| $CO/H_2$ (3:1), % | 0 | 4.5 | 0 | 4.5 | 0 | 4.5 | 0 | 4.5 | 0 | 4.5 | 0 | 4.5 |
| HC*, ppm | 100 | 1000 | 100 | 1000 | 100 | 1000 | 100 | 1000 | 100 | 1000 | 100 | 1000 |
| $H_2O$, % | 8 | 8 | 8 | 8 | 8 | 8 | 8 | 8 | 8 | 8 | 8 | 8 |

The $NO_x$ trapping capacity of the catalyst was measured after the end of the 1 minute rich exposure and presented as the amount of $NO_x$ removed from the feeding gas when 100 ppm of $NO_x$ was released. The cycle $NO_x$ conversion of the catalyst was measured as an average $NO_x$ conversion of the last five lean/rich cycles.

$$\text{Cycle } NOx \text{ Conversion}(\%) = \frac{(NOx \text{ input} - NOx \text{ output})}{NOx \text{ input}} \times 100\%$$

Example 6

XRD Measurement

The $CeO_2$ crystallite size of the Example 1 and 3 aged samples was measured by XRD. The samples were ground using a mortar and pestle and then packed onto a low background slide for analysis. A PANalytical MPD X'Pert Pro diffraction system was used to collect data in Bragg-Brentano geometry. We used $Cu_{K\alpha}$ radiation in the analysis with generator settings of 45kV and 40 mA. The optical path consisted of a ¼° divergence slit, 0.04 radian soller slits, 15 mm mask, ½° anti-scatter slit, ¼° anti-scatter slit, Ni filter, and X'Celerator linear position sensitive detector. Data was collected from 10° to 90° 2θ using a step size of 0.026° 2θ and a count time of 600 s per step. Jade Plus 9 analytical X-ray diffraction software was used for phase identification. The phase present was identified by search/match of the PDF-4/Full File database from ICDD, which is the International Center for Diffraction Data. All numerical values were determined using Rietveld methods.

Figure 3A:
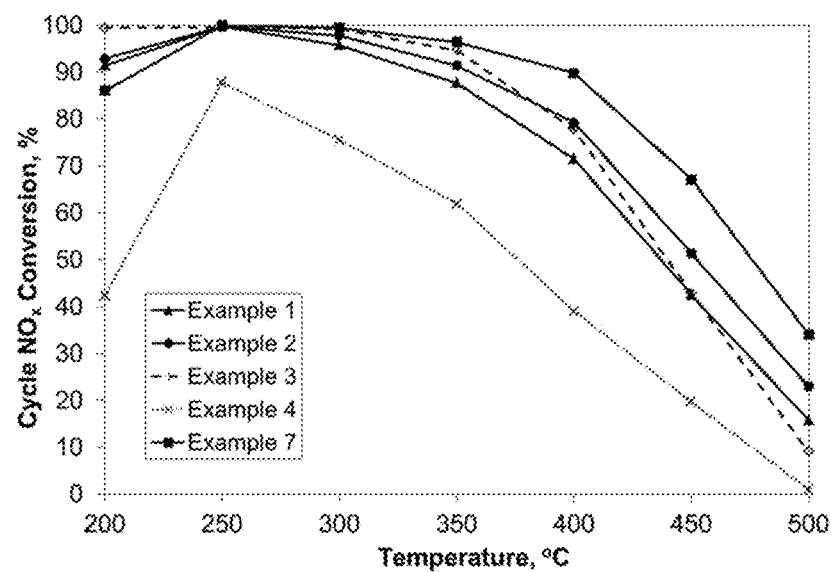
FIG. 3A is a graph of the cycle $NO_x$ conversion according to the Examples 1, 2, 3, 4, and 7 in fresh states.
Figure 3B:
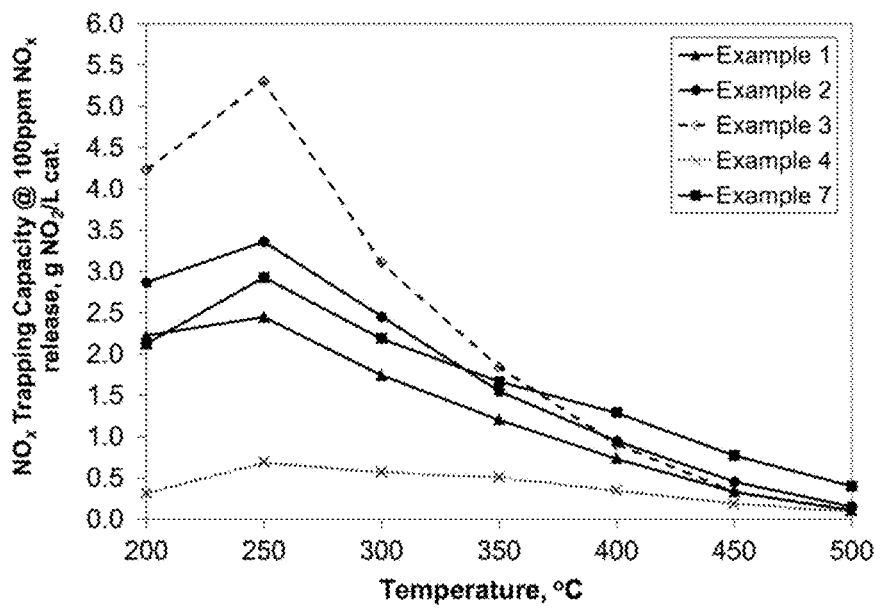
FIG. 3B is a graph of the $NO_x$ trapping capacity according to the Examples 1, 2, 3, 4, and 7 in fresh states.
Figure 4A:
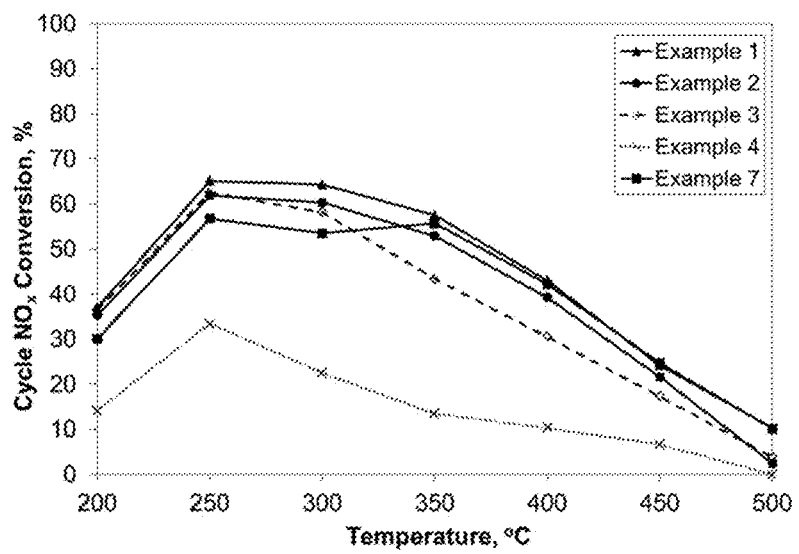
FIG. 4A is a graph of the cycle $NO_x$ conversion according to the Examples 1, 2, 3, 4, and 7 after aging at 950° C. for 5 hours in 2% $O_2$ and 10% steam in $N_2$.
Figure 4B:
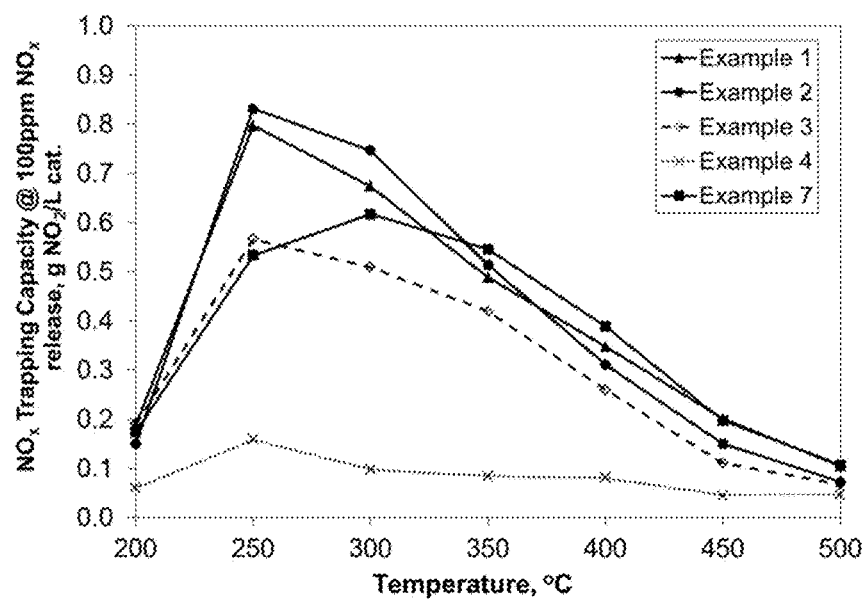
FIG. 4B is a graph of the $NO_x$ trapping capacity according to the Examples 1, 2, 3, 4, and 7 after aging at 950° C. for 5 hours in 2% $O_2$ and 10% steam in $N_2$.

The LNT-TWC catalyst Examples 1 and 2 significantly improved cycle $NO_x$ conversion and $NO_x$ trapping capacity relative to the TWC catalyst Comparative Example 4, as presented in FIGS. 3A and 3B. Although the cycle $NO_x$ conversion and the $NO_x$ trapping capacity of Examples 1 and 2 in fresh state are not as high as those of the LNT catalyst Example 3 in fresh state, Examples 1 and 2 have higher hydrothermal stability than Example 3. As presented in FIGS. 4A and 4B, after aging at 950° C. for 5 hours in 2% $O_2$ and 10% steam in $N_2$, Examples 1 and 2 show higher cycle $NO_x$ conversion and $NO_x$ trapping capacity than Example 3.

The high hydrothermal stability of Example 1 was also demonstrated by average $CeO_2$ crystallite size as measured by XRD after aging at 950° C. for 5 hours in 2% $O_2$ and 10% steam in $N_2$. The results are presented in Table 2. The $CeO_2$ present in Example 1 is more hydrothermally stable than that in Example 3. The average $CeO_2$ crystallite size of Example 1 is 109 Å after aging at 950° C. for 5 hours in 2% $O_2$ and 10% steam in $N_2$. The average $CeO_2$ crystallite size of Example 3 is 197 Å after at 950° C. for 5 hours in 2% $O_2$ and 10% steam in $N_2$. This stabilization effect is likely beneficial for $NO_x$ trapping and $NO_x$ reduction activity. The additional ceria surface area resulting from smaller crystallite sizes will allow for more low temperature ceria based $NO_x$ trapping, improve WGS, and improve PGM dispersion.

TABLE 2

| Example | $CeO_2$ Crystallite Size (Å)* |
|---|---|
| Example 1 | 109 |
| Comparative Example 3 | 197 |

*Measured after aging at 950° C. for 5 hours in 2% $O_2$ and 10% steam in $N_2$

Rietveld methods were used to fit experimental patterns for the aged Example 1 and Example 3. A FWHM curve determined for each phase in each sample was used to determine a crystallite size. Strain effects were excluded.

Figure 5A:
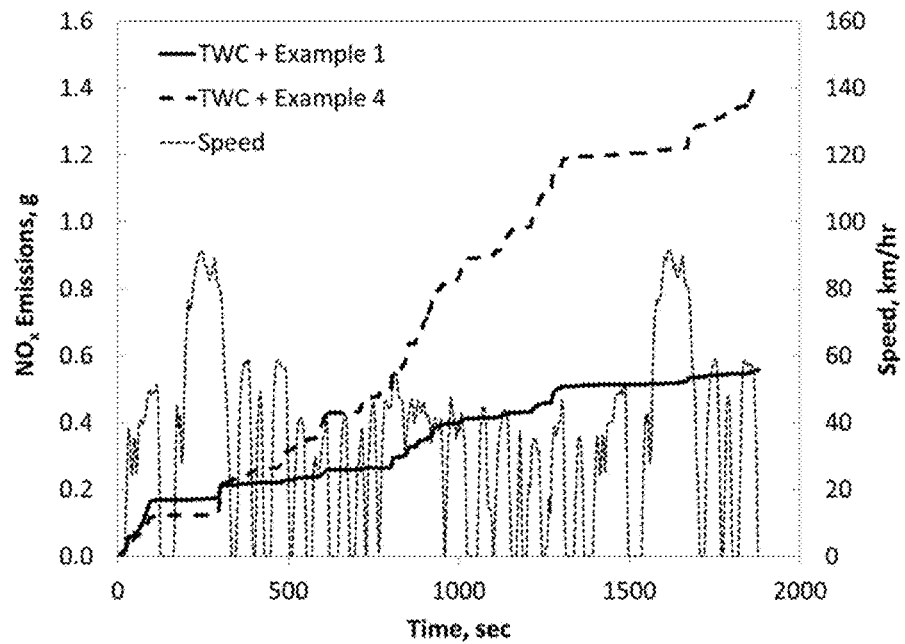
FIG. 5A is a graph of the tailpipe $NO_x$ emissions according to the Examples 1 and 4 after aging at 950° C. for 64 hours in an internal combustion engine.
Figure 5B:
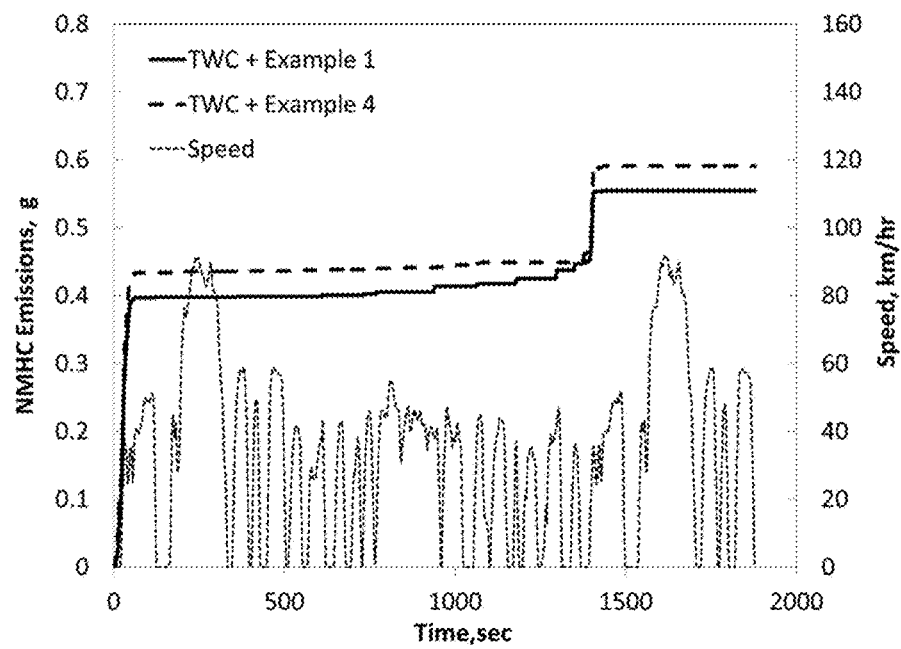
FIG. 5B is a graph of the NMHC emissions according to the Examples 1 and 4 after aging at 950° C. for 64 hours in an internal combustion engine.

Examples 1 and 4, respectively, were applied to treat the exhaust gas stream of a lean-burn gasoline engine after aging at 950° C. for 64 hours in an internal combustion engine placed downstream of a TWC catalyst. As presented in FIGS. 5A and 5B, in a FTP75 testing cycle, Example 1, when placed downstream of a TWC catalyst, significantly reduced $NO_x$ emissions relative to Example 4, when placed downstream of the same TWC catalyst, and Example 1 showed equivalent non-methane hydrocarbon (NMHC) emissions to Example 4.

Figure 6:
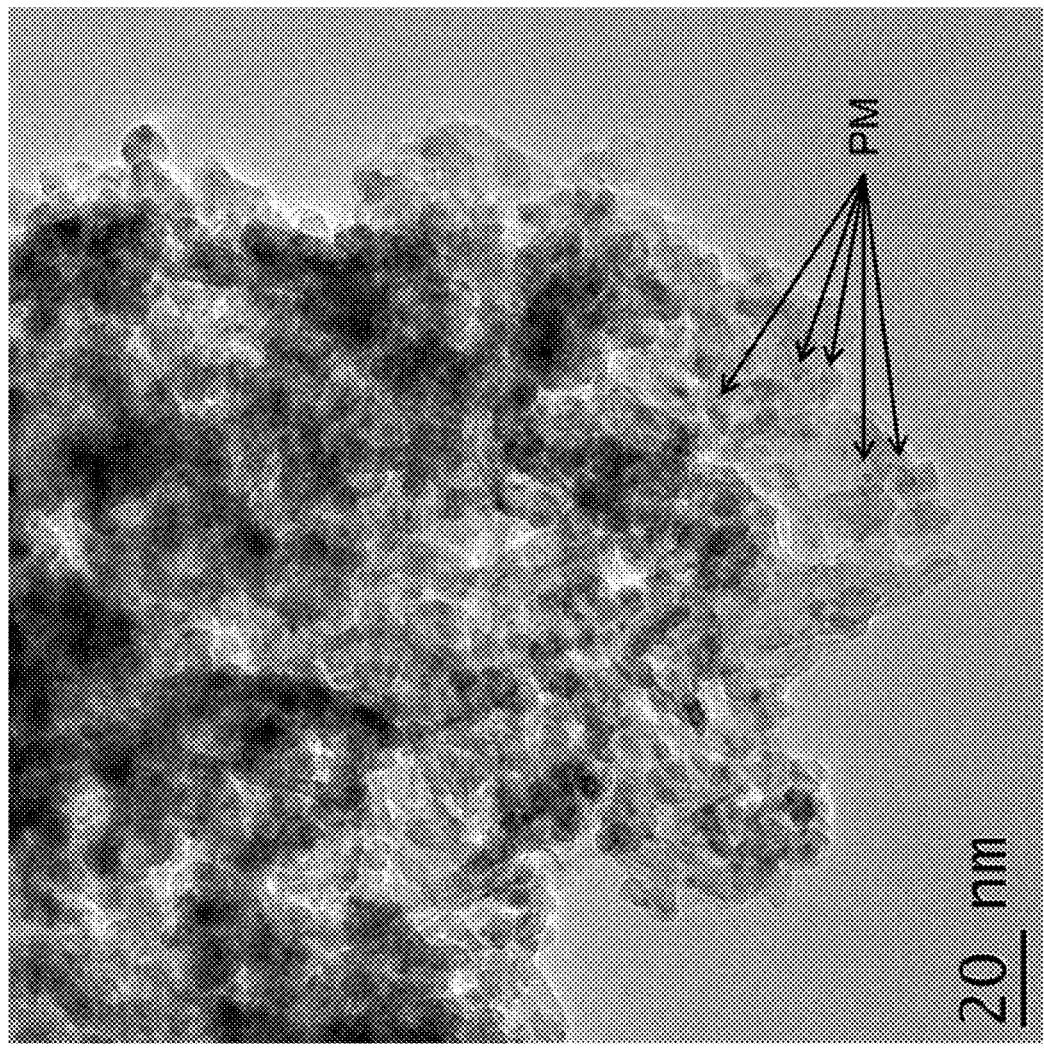
FIG. 6 is the TEM image of the undercoat of Example 1 in fresh state.

TEM of the undercoat layer of Example 1 showed that plates of $Al_2O_3$ and round agglomerates of $CeO_2$ are intimately mixed, and the nano-sized platinum particles are located on the mixed $CeO_2$ and $Al_2O_3$ particles, as presented in FIG. 6.

Figure 7:
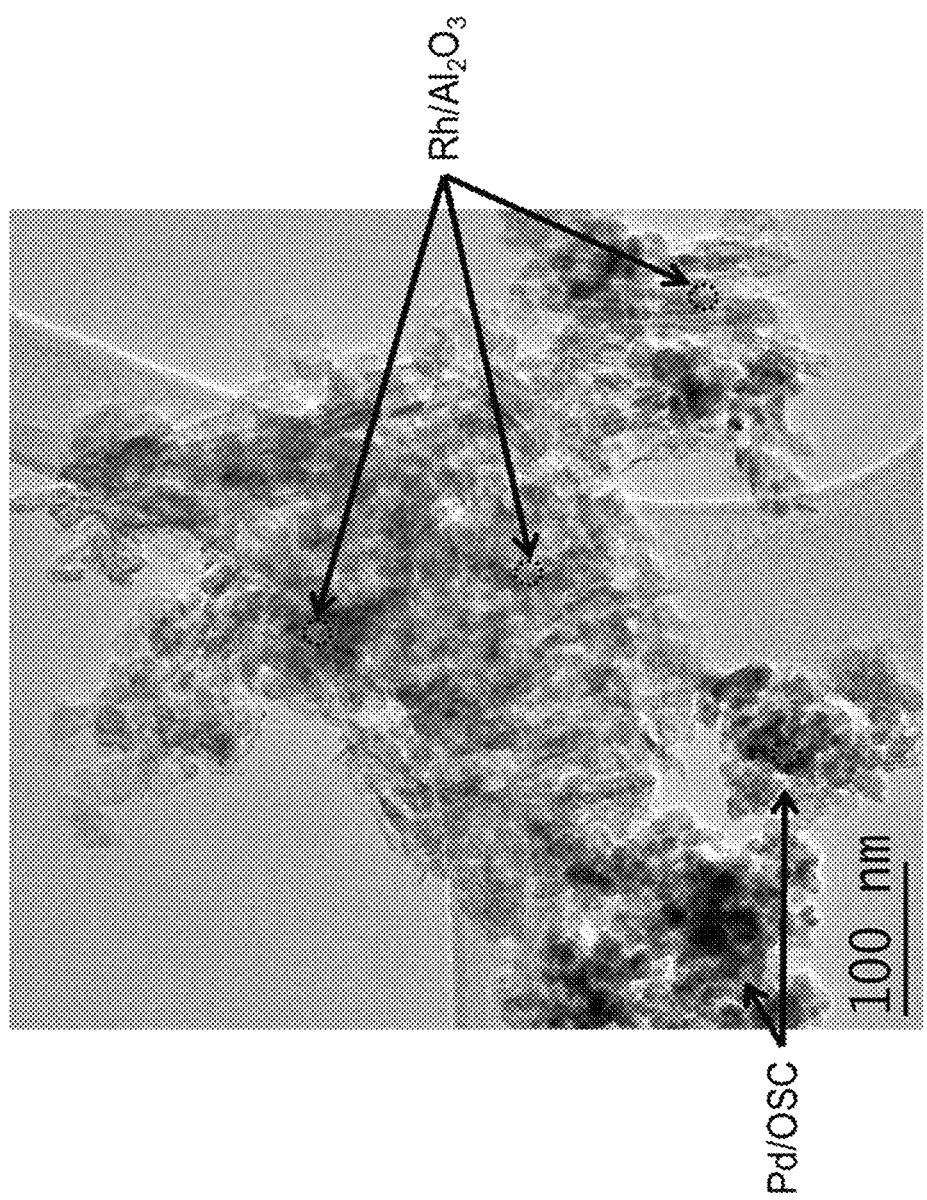
FIG. 7 is the TEM image of the topcoat of Example 1 in fresh state.

TEM of the topcoat layer of Example 1 showed that Rh particles are located on $Al_2O_3$ and Pd particles are located on OSC material, as presented in FIG. 7

Example 7

To demonstrate the advantage of this invention, an example of a LNT-TWC catalyst was prepared. This two layer formulation, which comprises an undercoat washcoat layer and a top washcoat layer, was coated onto a flow-through ceramic monolith substrate carrier having a cell density of 400 cells per square inch (cpsi) and a 4 mil wall thickness, the top washcoat layer being coated over the undercoat washcoat layer. The catalyst has a total 185 g/ft³ PGM nominal loading with a Pt/Pd/Rh ratio of 63/117/5.

Undercoat Washcoat Layer

Pd in the form of palladium nitrate was introduced onto the OSC material and Rh in the form of rhodium nitrate was introduced onto the activated γ-alumina. A slurry mixture containing about 15 wt. % of activated γ-alumina, 80 wt. % of OSC material ($CeO_2/ZrO_2$) with promoters, 2.3 wt. % of Pd, 0.1 wt. % of Rh, zirconium acetate to yield 2 wt. % of $ZrO_2$, was coated onto ceramic honeycomb substrates. The total washcoat of the top layer after 550° C. calcination was about 2.8 g/in³.

Topcoat Layer

The top layer was disposed on the undercoat layer. The $CeO_2$—$Al_2O_3$ particles comprising 50 wt. % of $CeO_2$ and 50 wt. % of $Al_2O_3$ were impregnated with a solution of barium acetate such that the $BaCO_3/(CeO_2$—$Al_2O_3)$ composite had a $BaCO_3$ content of about 26 wt. %. The mixture was dried at 110° C. and calcined at 720° C. for 2 hours. Pd in the form of palladium nitrate and Pt in the form of platinum amine solution were introduced onto the support material $BaCO_3/(CeO_2$—$Al_2O_3)$ by conventional incipient wetness impregnation. A slurry mixture containing about 87 wt. % of $BaCO_3/(CeO_2$—$Al_2O_3)$, 1 wt. % of Pt, 0.1 wt. % of Pd, magnesium acetate to yield 7 wt. % of MgO, zirconium acetate to yield 4 wt. % of $ZrO_2$, was coated over the entire under coat layer. The total washcoat loading of the undercoat layer after 550° C. calcination for one hour in air was about 3.4 g/in³.

What is claimed is:

1. A layered catalyst composite for an exhaust stream of an internal combustion engine, the layered catalyst composite comprising a catalytic material on a substrate, the catalytic material comprising at least two layers, wherein:
   the first layer comprises rare earth oxide-high surface area refractory metal oxide particles, an alkaline earth metal supported on the rare earth oxide-high surface area refractory metal oxide particles, and at least one first platinum group metal component supported on the rare earth oxide-high surface area refractory metal oxide particles, wherein the rare earth oxide-high surface area refractory metal oxide particles have a ceria phase present in a weight percent of the particles in the range of about 20% to about 80% on an oxide basis; and
   the second layer comprises a second platinum group metal component supported on a first oxygen storage component (OSC) and/or a first refractory metal oxide support and, optionally, a third platinum group metal supported on a second refractory metal oxide support or a second oxygen storage component.

2. The layered catalyst composite of claim 1, wherein the catalyst is effective to provide both lean $NO_x$ trap functionality and three-way conversion functionality.

3. The layered catalyst composite of claim 1, wherein the first layer is disposed on the substrate that comprises a flow-through monolith and the second layer is disposed on the first layer.

4. The layered catalyst composite of claim 1, wherein the second layer is disposed on the substrate that comprises a flow-through monolith and the first layer is disposed on the second layer.

5. The layered catalyst composite of claim 1, wherein the substrate comprises a wall-flow filter and the first layer is on an inlet set of passages and the second layer is on an outlet set of passages.

6. The layered catalyst composite of claim 1, wherein the substrate comprises a wall-flow filter and the first layer is on an outlet set of passages and the second layer is on an inlet set of passages.

7. The layered catalyst composite of claim 1 that is free of hydrocarbon trap material.

8. The layered catalyst composite of claim 1, wherein the rare earth oxide-high surface area refractory metal oxide particles comprise ceria-alumina particles.

9. The layered catalyst composite of claim 8, wherein the ceria-alumina particles are substantially free of alkaline earth metal.

10. The layered catalyst composite of claim 1, wherein the first, second, and third platinum group metal components independently comprise platinum, palladium, and/or rhodium.

11. The layered catalyst composite of claim 1, wherein the first platinum group metal component comprises both palladium and platinum.

12. The layered catalyst composite of claim 1, wherein the first platinum group metal component comprises platinum.

13. The layered catalyst composite of claim 1, wherein the second platinum group metal component comprises palladium.

14. The layered catalyst composite of claim 1, wherein the third platinum group metal component comprises rhodium.

15. The layered catalyst composite of claim 1, wherein the first and second refractory metal oxide supports independently comprise a compound that is activated, stabilized, or both selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, alumina-ceria, and combinations thereof.

16. The layered catalyst composite of claim 1, wherein the first and second oxygen storage components comprise a ceria-zirconia composite or a rare earth-stabilized ceria-zirconia.

17. The layered catalyst composite of claim 1, wherein the first oxygen storage component and the second oxygen storage component comprise different ceria-zirconia composites, the first oxygen storage component comprising ceria in the range of 35 to 45% by weight and zirconia in the range of 43 to 53% by weight and the second oxygen storage component comprising ceria in the range of 15 to 25% by weight and zirconia in the range of 70 to 80% by weight.

18. The layered catalyst composite of claim 1, wherein the alkaline earth metal comprises barium.

19. The layered catalyst composite of claim 18, wherein the barium is present in an amount in the range of about 5% to 30% by weight on an oxide basis of the first layer.

20. The layered catalyst composite of claim 19, wherein the barium is present in an amount in the range of about 0% to about 10% by weight on an oxide basis of the second layer.

21. The layered catalyst composite of claim 18, wherein the second alkaline earth metal comprises barium.

22. The layered catalyst composite of claim 1, wherein the second layer further comprises a second alkaline earth metal supported on the first refractory metal oxide support.

23. The layered catalyst composite of claim 1, wherein under lean conditions, the layered catalyst composite is effective to simultaneously store $NO_x$, and to oxidize CO, HC, and NO to $NO_2$.

24. The layered catalyst composite of claim 1, wherein under rich conditions, the layered catalyst composite is effective to simultaneously convert CO and HC and to release and reduce $NO_x$.

25. The layered catalyst composite of claim 1, wherein under stoichiometric conditions, the layer catalyst composite is effective to simultaneously convert CO, HC, and $NO_x$.

26. The layered catalyst composite of claim 1, wherein
   the catalyst composite is effective to provide both lean $NO_x$ trap functionality and three-way conversion functionality;
   the substrate comprises a flow-through carrier and the first layer is disposed on the substrate and the second layer is disposed on the first layer;
   the rare earth oxide-high surface area refractory metal oxide particles comprise ceria-alumina particles;
   the first platinum group metal component comprises palladium and/or platinum; the second platinum group metal component comprises palladium; and the third platinum group metal component comprises rhodium.

27. A method for treating a gas comprising hydrocarbons, carbon monoxide, and nitrogen oxides comprising: contacting the gas with the layered catalyst composite of claim 1, wherein:
   under lean conditions, the layered catalyst composite is effective to simultaneously store $NO_x$, and to oxidize CO, HC, and NO;
   under rich conditions, the layered catalyst composite is effective to simultaneously convert CO and HC and to release and reduce $NO_x$; and
   under stoichiometric conditions, the layered catalyst composite is effective to simultaneously convert CO, HC, and $NO_x$.

28. A method of making a layered catalyst composite, the method comprising providing a carrier and coating the carrier with first and second layers of catalytic material; the first layer comprising rare earth oxide-high surface area refractory metal oxide particles, an alkaline earth metal supported on the rare earth oxide-high surface area refractory metal oxide particles, and at least one first platinum group metal component supported on the rare earth oxide-high surface area refractory metal oxide particles, wherein the rare earth oxide-high surface area refractory metal oxide particles have a ceria phase present in a weight percent of the particles in the range of about 20% to about 80% on an oxide basis, the second layer being the outermost layer of the composite, comprising a second platinum group metal component supported on a first oxygen storage component (OSC) or a first refractory metal oxide support and a third platinum group metal component supported on a second refractory metal oxide support or a second oxygen storage component.

* * * * *